United States Patent [19]

Rinker et al.

[11] Patent Number: 5,531,042
[45] Date of Patent: Jul. 2, 1996

[54] FISHING SINKER HAVING INTERCHANGEABLE WEIGHTS

[76] Inventors: David E. Rinker, P.O. Box 1129, Cottonwood, Calif. 96022; Terry Vietz, E. 410 Main St., Pullman, Wash. 99163

[21] Appl. No.: 326,225

[22] Filed: Oct. 20, 1994

[51] Int. Cl.⁶ ................................................ A01K 85/00
[52] U.S. Cl. ........................ 43/42.06; 43/43.1; 43/43.14
[58] Field of Search ........................... 43/43.14, 43.12, 43/42.09, 42.06, 49.83, 43.1

[56] References Cited

U.S. PATENT DOCUMENTS

| | | | |
|---|---|---|---|
| 2,992,507 | 7/1961 | Gray | 43/42.09 |
| 3,178,881 | 4/1965 | Welch | 43/43.1 |
| 3,335,516 | 8/1967 | Sutton | 43/43.14 |
| 3,648,398 | 3/1972 | Newell | 43/43.14 |
| 3,883,981 | 5/1975 | Bohn | 43/43.12 |
| 3,943,654 | 3/1976 | Shine | 43/43.14 |
| 4,040,199 | 8/1977 | Raptis | 43/43.14 |
| 4,064,604 | 12/1977 | Hartman | 43/44.83 |
| 5,157,861 | 10/1992 | Peterson | 43/44.83 |
| 5,327,670 | 7/1994 | Tallerico | 43/42.06 |

FOREIGN PATENT DOCUMENTS 0678799  1/1964  Canada ................ 43/43.12

Primary Examiner—Jack W. Lavinder
Assistant Examiner—James Miner
Attorney, Agent, or Firm—Gene Scott

[57] ABSTRACT

The present invention relates to a fishing sinker having interchangeable weights. The invention comprises three basic elements, i.e. a connector for connecting the sinker to a fishing line, a sleeve, and an elongated weight. The connector may be a snap type or a snap-swivel type to connect to the fishing line. The sleeve is any material having flexibility and possibly resilience with an aperture in it to allow the elongated weight to pass almost completely through it. The elongated weight can be any common long weighty object, but is normally a common type penny nail. This is used because of the head as well as the inexpensive cost of such nails. The various sized nails are to be used for the various sized weights required for fishing as needed. The sleeve may include a fish attractant.

5 Claims, 1 Drawing Sheet

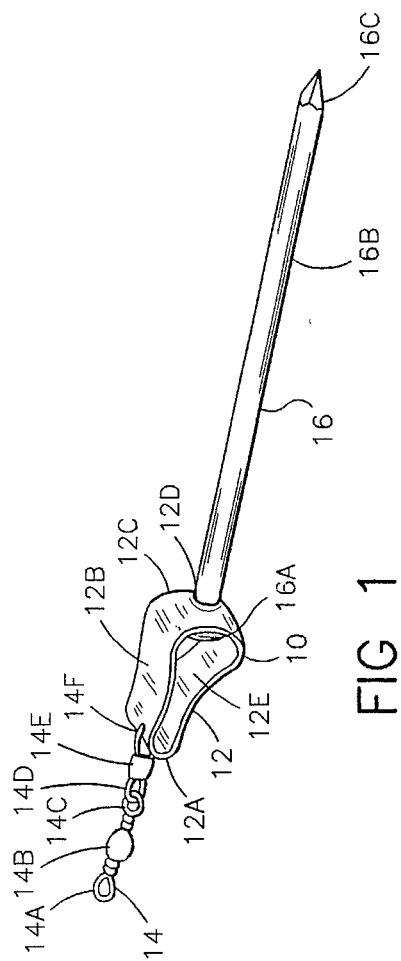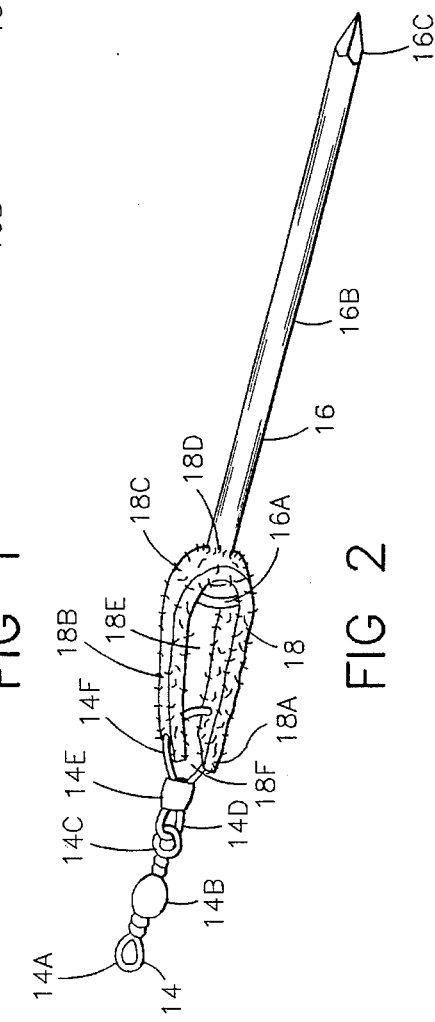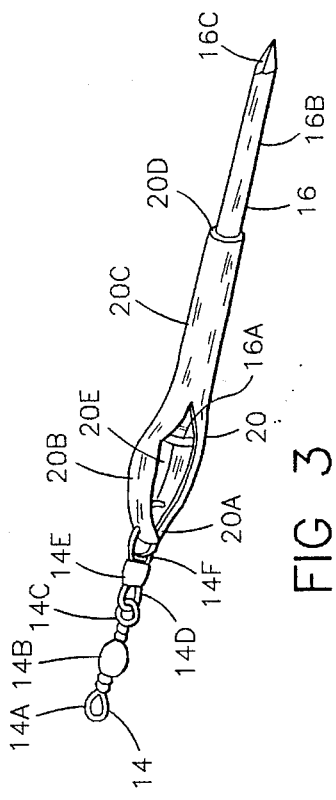

FISHING SINKER HAVING INTERCHANGEABLE WEIGHTS

BACKGROUND OF THE INVENTION

1. Field of the Invention

This invention relates to fishing sinkers. More specifically, a fishing sinker having interchangeable weights where the weights are common materials.

2. Description of the Prior Art

Fisherman on both a professional level and on an amateur level use many varied weighted sinkers depending upon the depth and current of the waters that they are fishing in. Changing these sinkers or adding and subtracting sinkers from the fishing line can be both time consuming and costly.

The prior art has proposed a number of devices for releasable or changeable sinkers. Heretofore, such devices have either involved complex mechanisms in order to release the sinker when necessary, or the devices have been cumbersome or expensive for the operator to use.

Numerous innovations for a fishing sinker having interchangeable or removable weights have been provided in the prior art that are described as follows. Even though these innovations may be suitable for the specific individual purposes to which they address, they differ from the present invention as hereinafter contrasted.

U.S. Pat. No. 4,291,485
Automatically Releasing Mounting System For a Weight Member
Josef Koller The invention provides for an automatically releasing mounting system by dint of which a weight member may be releasably connected to a fishing-line. The mounting system comprises a receptacle resiliently biased into essentially conical shape. Wall portions of the receptacle are interconnected by a pivotal joint near the upper end thereof, while latch apparatus are provided to releasably connect the lower ends of the wall portions. the latch apparatus include a latch member having a wing formed integral thereto. When the receptacle hits the surface of the water, the relative movement between the water and the wing portion of the latch member will cause moving of the latch member out of the associated latch-catch. Thus the wall portions of the receptacle cooperating in defining the lower aperture of the container can expand. The receptacle including the latch apparatus can be molded as a single essentially flat part. In order to keep this molded part having been correspondingly bent in the conical or cylindrical configuration the pivotal joint is formed by two members associated to one of the wall portions, respectively, and being adapted for releasable mutual engagement.

This prior art patent differs from the present invention in that this prior art automatically releases a weight member upon hitting the surface of the water. The present invention, by contrast, has a removable weight member that can be removed and replaced by the user before using the weight in the water. The present inventions weight will not disengage from the rest of the apparatus upon hitting the water. The removability is to exchange weights for ones of different sizes.

U.S. Pat. No. 4,125,958
Tension Release Coupling For Fishing Line
Bernard Cot

A coupling assembly adapted to connect a fishhook to the remainder of a fishing line, including the lure, and which responds to tension on this remainder of the fishing line to release the same free of the fishhook when the latter catches a submerged obstacle. This tension release coupling assembly includes a resilient coupling member, such as of plastic, which is attached to the cord of the fishing line and which has a cavity therein adapted to releasably catch the eye of a common fishhook or an enlarged end portion of a specially made fishhook or hook connector member. The resilient coupling member may be calibrated in relation to the different strengths of cord used for the fishing lines such that the fishhook will be released before the tensional strength of the corresponding cord is reached. The resilient coupling members are colored in accordance with a code distinctive of the predetermined calibration of strength thereof.

As with the earlier referenced, prior art invention is concerned with the ability to release the entire sinker mechanism if there is enough tension on the cord. This will normally happen if the fishing hook becomes entangled with something in the water or caught on the bottom of the floor of the body of water that the fisherman is in. The device will also release if the fish pulls with a strong enough force. The present invention instead, is concerned with being able to change the weights of the sinker in a quick and inexpensive manner before casting the fishing line.

U.S. Pat. No. 3,982,350
Fishing Line Weight
Donald W. Hockathorn

A device for simply attaching a stone or rock to a fishing line to function as a casting or sinker weight. The device includes a flexible elastic strap capable of encircling a stone or rock and conforming to its peripheral surface. The device further includes means for securing the strap to a fishing line.

In the above prior art invention, the operator of the device is concerned with being able to cast the fishing hook far from the user by having added weight to the line and then being able to automatically remove said weight from the line so that the line does not sink to the bottom of the body of water. This invention is not concerned with being able to change the weight of the weight as the instant invention is, the prior art invention is only interested with the immediate removal of it once the weight hits the water.

U.S. Pat. No. 3,659,372
Sinker Release Method and Apparatus
Robert E. Cullen

A fishing apparatus attachable to and moveable along a fishing line so as to attaching a stone or rock to a fishing line to provide a recoverable sinker release that is operative when retrieving a catch. A fishing line with a swivel connecting a leader and bait or lure is threaded through two concentric, interlocking, cylindrically shaped members, the inner one of which is provided with an attaching means for carrying various sized sinkers. The concentric members are locked together in use by a spring extending through an opening in the inner member to rest against said swivel. As a catch in retrieved, the outer concentric member contacts the to of a fishing rod or pole and disengages said spring from contact with the swivel, thereby permitting said catch to be retrieved.

The present invention has no mechanical engagement or disengagement members nor is the present invention used to disengage the sinker while in the water as is the case in the above referenced prior art. This prior art uses various sized stones as the weights whereas the instant invention uses various sized nails as the weights.

U.S. Pat. No. 3,648,398
Adjustable and Releasable Sinker Adapted For Attachment to Fishing Line
Carl W. Newell A unitary tubular holder, preferably molded of resilient material such as plastic, has an attachment eye molded at one end thereof with the bore opening at the other end thereof. A preferably cylindrical weight is positioned in the holder bore open end preferably partially extending from the holder and expanding the holder for releasable gripping therebetween. The holder hastening eye may be attached to a fishing line and engagement of the weight by an exterior object will cause a release of the weight from the holder bore upon a force at the holder fastening eye.

The above referenced prior art is specifically designed for a single sized weight that can be released when the fishing line becomes fouled on objects beneath the surface of the water, such as rocks, heavy weeds and similar objects. The present invention is designed for various sized weights that do not release in the water, i.e. release only when the user removes them to exchange one weight size for another weight size.

U.S. Pat. No. 3,619,932
Weight Release Mechanism
James D. Maxwell

A weight release mechanism includes a tubular body portion and end enclosures through which a wire-like shank slidably extends. The shank has opposite ends projecting from the body portion one of such ends being arranged to be connected to a pole line and the other end to a fish line. The shank has an offset parallel finger which extends interiorly of the body portion and operates in the area of a window provided in the body portion. Such finger is arranged to engage the end loop of a weight line. The shank is formed of a spring wire or the like and has spring convolutions formed directly therein which provide elongation of the shank to the extent that the weight release finger is movable out of the plane of the window to release the weight, such action occurring when a large fish is hooked and also when the weight becomes snagged.

The above referenced prior art is a complex means of being able to free weight from the tackle in the event that a fish is hooked or also in the event that the weight is snagged. This is done by separating the weight from the rest of the tackle by means of a series of wires and coils. Again, the present invention does not remove the weight from the tackle or fishing line while the line is being used to fish, i.e. while the line is in the water. The only time the weight is removed is explicitly by the operator in order to exchange the weight for one of greater or lesser value.

U.S. Pat. No. 3,605,319 issued to J. R. Griffith; U.S. Pat No. 3,516,192 issued to H. W. MacLeod; U.S. Pat. No. 3,513,583 issued to N. A. Leash; and U.S. Pat. No. 3,426,469 issued to O. M. Lee et al all discuss various types of detachable sinkers and weights. Some of which detach automatically upon contact with the water where others need a force such as pulling on the line, but all of the sinkers or weights detach while in the water. None of the above reference patents discuss detaching or exchanging the weights for ones of various size before use while still attached to the fishing line. As a further distinction between all the above referenced prior art patents is that in the instant invention an attractant is added to the sleeve in order to attract certain fish while repulsing others.

The inventor has previously submitted this invention under Disclosure Document Program submission number 321016 dated Dec. 3, 1992 entitled "Precision Release Drift Weight". The inventor, David E. Rinker, has also previously filed for a "Snagless Sinker", Ser. No. 07/449,599 filed Dec. 12, 1989, now abandoned as of Sep. 19, 1990. Both of these documents teach some material in common with the present invention.

SUMMARY OF THE INVENTION

The fishing sinker having interchangeable weights comprises a connecting member that attaches to the fishing line, a circular sleeve and an elongated weight member.

The device is for the purpose of providing a simple means for a fisherman to change the weight of the sinker depending upon different fishing conditions. The connecting member may be a snap type or a snap-swivel type connection to the sleeve. There must be at least one loop on the connector in order for the user to attach the fishing line.

The weight is usually a type of common penny nail but can be any long weighty object. This allows the fisherman to have handy many different size weights without incurring the undue expense of buying special sinkers for each weight needed. This also eliminates the fear of losing and having to replace costly sinkers while fishing. The only requirement of the weighty object for use in the current invention is that the weight have a flat head of larger diameter than the body, i.e. sufficiently large enough as not to be able to fit through the aperture in the sleeve. The elongated body of the nail must be narrow enough in diameter as to fit through the aperture in the sleeve. The nails can therefore fairly widely, e.g. from 4D to 20D, 0.05 ounce to 1.5 ounce common penny nails.

The sleeve itself can be made from any flexible material, e.g. fabric, rubber or plastic. It can also have properties that are noted for its resilience as well as permeability or absorbency. A scenting agent can be permeated into the sleeve as an attractant. This can be selected for attracting certain fish and not others as a means for discriminating between them. The attractants can be made from the bodies or excretions of the target fish's main prey, such as extract from insects when fishing for Bass, or it could be made from standard fish bait. The sleeve may be longer or shorter, smooth or not, and vary in other ways, e.g. thickness, color and mechanical characteristics.

More particularly, it is an object of the present invention to provide a simple means for any fisherman to be able to exchange weights on his fishing line without having a cumbersome task and without the expense of a multitude of specialized fishing weights. A further object of the present invention is to provide a device that enables the user to discriminate as to what type of fish he is trying to catch.

In keeping with these objects, and with others which will become apparent hereinafter, one feature of the present invention resides, briefly stated, in the ability to use common penny nails as the various weights.

In accordance with another feature of the present invention, the addition of a scenting agent allows the user to discriminate in fishing for selected fish. The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

FIG. 1 is a perspective view of the fishing sinker of the instant invention showing a flexible sleeve and nail in the fashion of the teaching;

FIG. 2 is a perspective view of the fishing sinker of the instant invention in an alternate embodiment with a flexible sleeve of non-smooth character; and FIG. 3 is a perspective view of the fishing sinker of the instant invention showing an alternate embodiment having an extended sleeve encompassing the nail of the invention.

DETAILED DESCRIPTION OF THE PREFERRED EMBODIMENT

Firstly, referring to FIG. 1 showing a pictorial view of the fishing sinker circular sleeve having interchangeable weights, exhibiting the following features: fishing sinker with interchangeable weights 10 comprising: a fishing sinker circular sleeve 12 fishing line connector member 14 and an elongated weight 16; fishing sinker circular sleeve 12 with a fishing sinker circular sleeve fishing line connection member 12A attaching fishing line connector member 14 on one end with a fishing sinker circular sleeve weight circular aperture 12D on the other functioning as a holding mechanism for an elongated weight 16 such as a common penny nail; fishing sinker circular sleeve fishing line connection member 12A integrally connecting the fishing line connector with sleeve loop 14F; fishing sinker circular sleeve exterior 12B loops around connecting the fishing line connector member 14 with the elongated weight 16; fishing sinker circular sleeve forward member 12C housing the fishing sinker circular sleeve weight circular aperture 12D that connects to the elongated weight 16; fishing sinker circular sleeve weight circular aperture 12D holding the elongated weight 16 in place until removed by the user; fishing sinker circular sleeve interior 12E flexes allowing the user to remove and replace the various sized elongated weights 16; fishing line connector member 14 comprising a fishing line connector tie loop 14A a fishing line connector swivel 14B, a fishing line connector junction loop 14C, a fishing line connector linkage 14D, a fishing line connector loop pincher 14E, and a fishing line connector with sleeve loop 14F; fishing line connector tie loop 14A connecting the fishing sinker with interchangeable weights 10 to the fishing line; fishing line connector swivel 14B allowing the fishing sinker circular sleeve 12 to rotate freely while in the water, thus, avoiding twisting and knotting of the fishing line; fishing line connector junction loop 14C connecting the fishing line connector 14 with the fishing sinker circular sleeve 12 by way of the fishing line connector linkage 14D; fishing line connector linkage 14D looping through the fishing line connector junction loop 14C, thus, linking the fishing line connector 14 with the fishing sinker circular sleeve 12; fishing line connector loop pincher 14E squeezing between the fishing line connector linkage 14D and the fishing line connector with sleeve loop 14F securing the fishing line connector 14 with the fishing sinker circular sleeve 12; fishing line connector with sleeve loop 14F passing through the fishing sinker circular sleeve fishing line connection member 12A connecting the fishing line connector with sleeve loop 14F to secure the fishing line connector 14 with the fishing sinker circular sleeve 12; elongated weight 16 comprising an elongated weight flat head 16A, an elongated weight shaft 16B, and an elongated weight tapered point 16C; elongated weight flat head 16A ensuring that the elongated weight 16 does not slip through the fishing sinker circular sleeve weight circular aperture 12D; elongated weight shaft 16B fitting snugly through the fishing sinker circular sleeve weight circular aperture 12D; and elongated weight tapered point 16C allowing the elongated weight to easily slip through the fishing sinker circular sleeve weight circular aperture 12D.

Now, referring to FIG. 2 being a pictorial view of the fishing sinker open sleeve member having interchangeable weights exhibiting the following features: fishing line connector member 14 comprising a fishing line connector tie loop 14A a fishing line connector swivel 14B, a fishing line connector junction loop 14C, a fishing line connector linkage 14D, a fishing line connector loop pincher 14E, and a fishing line connector with sleeve loop 14F; fishing line connector tie loop 14A connecting the fishing sinker with interchangeable weights 10 to the fishing line; fishing line connector swivel 14B allowing the fishing sinker circular sleeve 12 to rotate freely while in the water, thus, avoiding twisting and knotting of the fishing line; fishing line connector junction loop 14C connecting the fishing line connector 14 with the fishing sinker circular sleeve 12 by way of the fishing line connector linkage 14D; fishing line connector linkage 14D looping through the fishing line connector junction loop 14C, thus, linking the fishing line connector 14 with the fishing sinker circular sleeve 12; fishing line connector loop pincher 14E squeezing between the fishing line connector linkage 14D and the fishing line connector with sleeve loop 14F securing the fishing line connector 14 with the fishing sinker circular sleeve 12; fishing line connector with sleeve loop 14F passing through the fishing sinker circular sleeve fishing line connection member 12A connecting the fishing line connector with sleeve loop 14F to secure the fishing line connector 14 with the fishing sinker circular sleeve 12; elongated weight 16 comprising an elongated weight flat head 16A, an elongated weight shaft 16B, and an elongated weight tapered point 16C; elongated weight flat head 16A ensuring that the elongated weight 16 does not slip through the fishing sinker circular sleeve weight circular aperture 12D; elongated weight shaft 16B fitting snugly through the fishing sinker circular sleeve weight circular aperture 12D; elongated weight tapered point 16C allowing the elongated weight to easily slip through the fishing sinker circular sleeve weight circular aperture 12D; fishing sinker open sleeve member 18 with a fishing sinker open sleeve member fishing line connection member 18A attaching the fishing line connector member 14 on one end and a fishing sinker open sleeve member weight circular aperture 18D on the other holding an elongated weight 16 such as a common penny nail; fishing sinker open sleeve member fishing line connection member 18A integrally connecting fishing line connector with sleeve loop 14F; fishing sinker open sleeve member exterior 18B looping around connecting the fishing line connector member 14 with the elongated weight 16; fishing sinker open sleeve member closed perimeter 18C housing the fishing sinker open sleeve member weight circular aperture 18D that connects to the elongated weight 16; fishing sinker open sleeve member weight circular aperture 18D holding the elongated weight 16 in place until removed by the user; fishing sinker open sleeve member interior 18E flexes allowing the removing and replacing of the various sized elongated weights 16; and fishing sinker open sleeve member loop opening 18F adding flexibility and increased movement of the water through the fishing sinker circular sleeve 12.

Lastly, referring to FIG. 3 being a pictorial view of the fishing sinker encasement sleeve having interchangeable weights, exhibiting the following features: fishing line connector member 14 comprising a fishing line connector tie loop 14A a fishing line connector swivel 14B, a fishing line connector junction loop 14C, a fishing line connector linkage 14D, a fishing line connector loop pincher 14E, and a fishing line connector with sleeve loop 14F; fishing line connector tie loop 14A connecting the fishing sinker with interchangeable weights 10 to the fishing line; fishing line connector swivel 14B allowing the fishing sinker circular sleeve 12 to rotate freely while in the water, thus, avoiding twisting and knotting of the fishing line; fishing line connector junction loop 14C connecting the fishing line connector 14 with the fishing sinker circular sleeve 12 by way of the fishing line connector linkage 14D; fishing line connector linkage 14D looping through the fishing line connector junction loop 14C, thus, linking the fishing line connector 14 with the fishing sinker circular sleeve 12; fishing line connector loop pincher 14E squeezing between the fishing line connector linkage 14D and the fishing line connector with sleeve loop 14F securing the fishing line connector 14 with the fishing sinker circular sleeve 12; fishing line connector with sleeve loop 14F passing through the fishing sinker circular sleeve fishing line connection member 12A connecting the fishing line connector with sleeve loop 14F to secure the fishing line connector 14 with the fishing sinker circular sleeve 12; elongated weight 16 comprising an elongated weight flat head 16A, an elongated weight shaft 16B, and an elongated weight tapered point 16C; elongated weight flat head 16A ensuring that the elongated weight 16 does not slip through the fishing sinker circular sleeve weight circular aperture 12D in that the interior diameter of the sleeve is smaller than the head of the elongated weight; elongated weight shaft 16B fitting snugly through the fishing sinker circular sleeve weight circular aperture 12D; elongated weight tapered point 16C allowing the elongated weight to easily slip through the fishing sinker circular sleeve weight circular aperture 12D; fishing sinker encasement sleeve 20 attaching the fishing line connector member 14 on one end and a fishing sinker encasement sleeve weight circular aperture 20D on the other holding an elongated weight 16 such as a common penny nail; fishing sinker encasement sleeve fishing line connection member 20A integrally connecting the fishing line connector with sleeve loop 14F; fishing sinker encasement sleeve exterior 20B looping around connecting the fishing line connector member 14 with the elongated weight 16; fishing sinker encasement sleeve closed perimeter 20C housing the fishing sinker encasement sleeve weight circular aperture 20D that connects to the elongated weight 16; fishing sinker encasement sleeve weight circular aperture 20D holding the elongated weight 16 in place until removed by the user; and fishing sinker encasement sleeve interior 20E flexes allowing the user to remove and replace the various sized elongated weights 16.

It will be understood that each of the elements described above, or two or more together, may also find a useful application in other types of constructions differing from the type described above.

While the invention has been illustrated and described as embodied in a fishing sinker with interchangeable weights, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A fishing sinker for use with interchangeable weight, for fishing sinker comprising:

a fishing line connector member;

a flexible, ring-shaped, sinker sleeve having an aperture for mounting a sinker weight;

a means of attaching said fishing line connector member to the sinker sleeve; and an elongated sinker weight having an elongated shaft mounted in the aperture of the sinker sleeve and frictionally held therewithin, and an integral head at one end of the elongated shaft, the head larger than the aperture, thereby, unable to pass therethrough;

the sinker sleeve having a scenting agent permeated therein as a fish attractant, and being of such flexibility as to flatten into an elongated linear shape under the weight of the sinker weight.

2. The fishing sinker for use with interchangeable weights as described in claim 1, whereas said weights being common nails.

3. The fishing sinker for use with interchangeable weights as described in claim 1, whereas said flexible sinker sleeve is constructed from a material taken from the group of flexible materials including fabric, rubber, leather, foam rubber, polyurethane, and polyethylene.

4. A fishing sinker for use with interchangeable weight, said fishing sinker comprising:

a fishing line connector member;

a flexible, tube-shaped, sinker sleeve for mounting a sinker weight said sleeve having an interior diameter;

a means of attaching said fishing line connector member to the sinker sleeve and an elongated sinker weight consisting of an elongated shaft and an integral head at one end of the elongated shaft, said elongated sinker weight mounted in the sinker sleeve and held therewithin, the head larger than the interior diameter of said sinker sleeve, thereby, unable to pass through the sleeve.

5. The sinker of claim 4 wherein the sinker sleeve further includes a scenting agent permeated therein as a fish attractant.

* * * * *